United States Patent [19]

McKay

[11] Patent Number: 5,031,731
[45] Date of Patent: Jul. 16, 1991

[54] BRAKE ACTUATOR WITH SLACK ADJUSTER DISABLING MECHANISM

[75] Inventor: Albert A. McKay, Stoney Creek, Canada

[73] Assignee: Wabco Standard Trane Inc., Toronto, Canada

[21] Appl. No.: 472,002

[22] Filed: Jan. 29, 1990

[51] Int. Cl.⁵ .............................................. F16D 65/56
[52] U.S. Cl. ........................ 188/196 BA; 188/106 F; 192/111 A
[58] Field of Search ............ 188/196 BA, 198, 202, 188/106 F, 71.9; 192/111 A

[56] References Cited

U.S. PATENT DOCUMENTS

| 1,606,683 | 11/1926 | Athimon | 188/196 BA |
| 2,301,272 | 11/1942 | Goepfrich | 188/79.52 |
| 3,017,962 | 1/1962 | Ingres | 188/79.56 |
| 3,707,208 | 12/1972 | Kyllonen | 188/196 B AX |
| 3,990,546 | 11/1976 | Schultz | 188/196 BA |

FOREIGN PATENT DOCUMENTS 1475109  2/1967  France .......................... 188/196 BA Primary Examiner—George E. A. Halvosa
Attorney, Agent, or Firm—G. J. Falce

[57] ABSTRACT

A brake actuator having a service brake coupled to an emergency/parking brake through a lost-motion connection that allows the service brake to be applied independently of the emergency/parking brake includes a slack adjuster, the pawl of which is withheld from engagement with the teeth of the slack adjuster ratchet wheel by an interrupter vane whenever the emergency/parking brake is actuated, to thereby disable the slack adjuster.

4 Claims, 3 Drawing Sheets

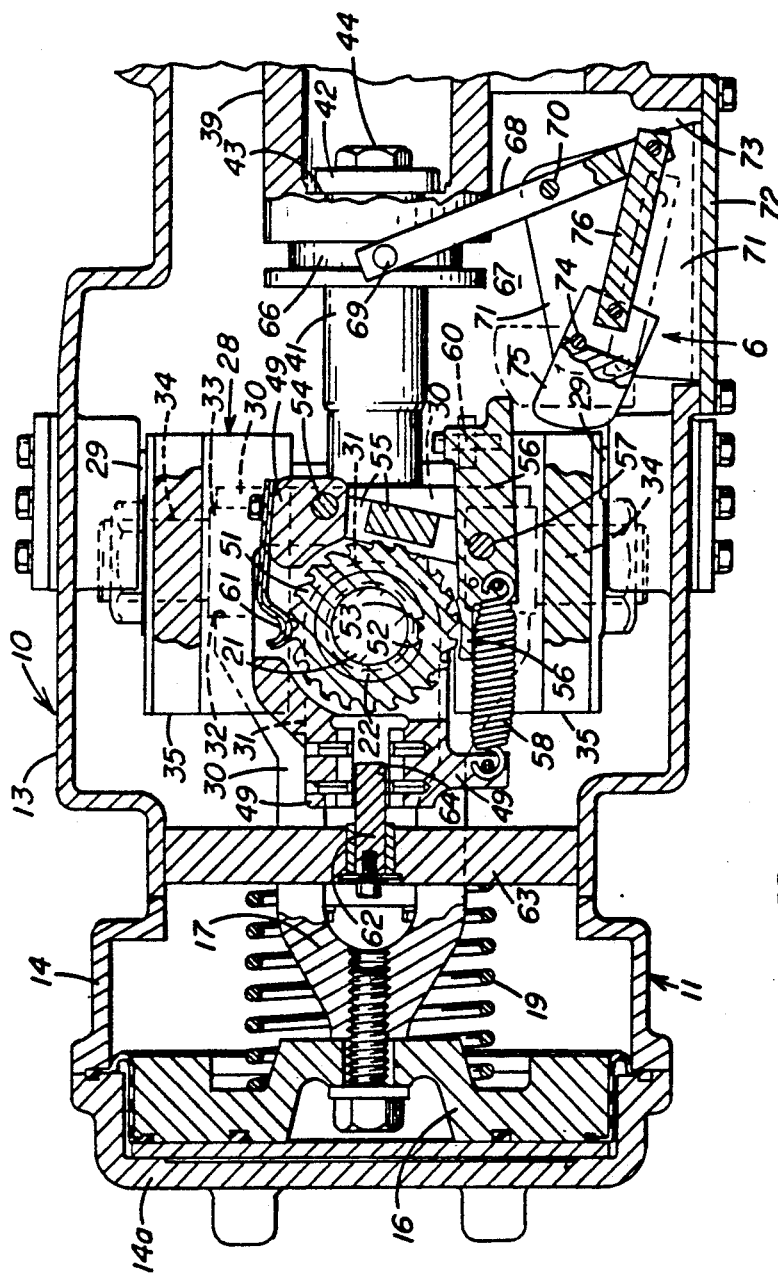
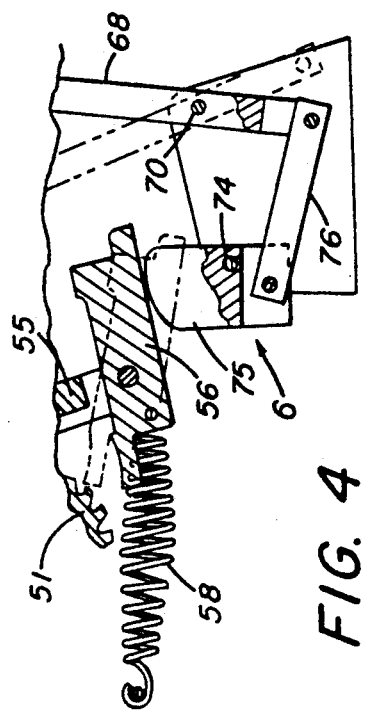
FIG. 2
FIG. 4

BRAKE ACTUATOR WITH SLACK ADJUSTER DISABLING MECHANISM

BACKGROUND OF THE INVENTION

The present invention relates to brake actuators, and particularly to such brake actuators as incorporate a combined back-up emergency and parking brake in conjunction with the primary service brake.

In one such brake actuator, the service brake is air-applied, spring-released; and the emergency/parking brake is spring-applied, air-released. A lost-motion coupling between the service and emergency brake pistons allows either one or both pistons to be effective to apply braking force. By utilizing a common source of air for the service and emergency brakes, failure of the service brake due to loss of air, for any reason, such as insufficient compressor capacity, automatically results in the emergency brake being applied under spring force. Typically, force amplification levers are employed to obtain high braking force without increasing cylinder size. This, in turn, requires the use of a slack adjuster to compensate for excessive piston travel throughout the range of brake shoe wear.

A typical slack adjuster used with the aforementioned brake actuator employs a toothed ratchet wheel that is arranged to effect rotation of an axially fixed nut member having threaded engagement with a brake actuator rod that is fixed against rotation. A pawl is actuated to engage a tooth of the ratchet wheel when the piston stroke exceeds a nominal distance during a brake application. During a brake release, a spring connected to the pawl pulls it in a direction tangential to the circumference of the ratchet wheel teeth to effect rotation of the ratchet wheel and, consequently, of the nut member. Since the threaded actuator rod is fixed against rotation, this rotation of the nut member forces the actuator rod to advance axially and thereby take up excess brake shoe clearance. The slack adjuster is designed to operate in increments of one tooth at a time. Since the maximum distance that the pawl shifts is determined by the maximum piston stroke, the continuous slack adjuster action will assure that the pawl does not normally shift a distance greater than that necessary to engage a single tooth at a time.

The aforementioned brake actuator is also provided with a manual release mechanism for releasing the parking brake when no air is available. This manual release mechanism operates through the brake actuator rod assembly to shorten the brake linkage which, in turn, causes the service and emergency pistons to bottom out. Once this occurs, continued operation of the manual release mechanism forces the actuator rod assembly to retract the brake shoes. It will be appreciated, however, that in bottoming out during this manual release operation, the service and emergency pistons move a distance sufficient to cause the slack adjuster pawl to shift several teeth over the ratchet wheel. This results in the line of action of the pawl swinging from its normal tangential alignment relative to the ratchet wheel teeth to a generally radial alignment relative to the ratchet wheel, thereby becoming jammed to render the slack adjuster inoperable.

Moreover, the high compressive forces acting on the brake linkage when the service and emergency brakes are both applied, result in over-travel of the brake actuator pistons due to slight bending of the linkage components, thus giving a false indication of excessive brake shoe wear. The piston over-travel resulting from this apparent excessive brake shoe wear causes the slack adjuster to over-extend the brake linkage in attempting to compensate for slack that does not actually exist. Accordingly, insufficient brake shoe clearance and possible brake lock-up can occur.

SUMMARY OF THE INVENTION

It is the object of the present invention to automatically disable the slack adjuster under the aforementioned conditions in which the slack adjuster mechanism could either become jammed or could operate inappropriately.

In carrying out the foregoing objective, there is provided in a brake actuator device an actuator rod assembly, a service brake, and an emergency/parking brake for effecting axial operation of the actuator rod assembly, a slack adjuster for varying the effective axial length of the actuator rod assembly, a lost-motion connection via which the service brake and emergency/parking brake are connected such as to permit actuation of the service brake independently of the emergency/parking brake, and a mechanism for disabling the slack adjuster whenever the emergency/parking brake is operated.

BRIEF DESCRIPTION OF THE DRAWINGS

These and other objects and advantages of the present invention will appear in the following more detailed explanation when taken with the accompanying drawings in which:

FIG. 2 is a section view taken along the lines 2—2 of FIG. 1;

FIG. 4 is a partial section view of FIG. 2 showing the slack adjuster disabling mechanism in its activated position.

DESCRIPTION AND OPERATION

Figure 1:
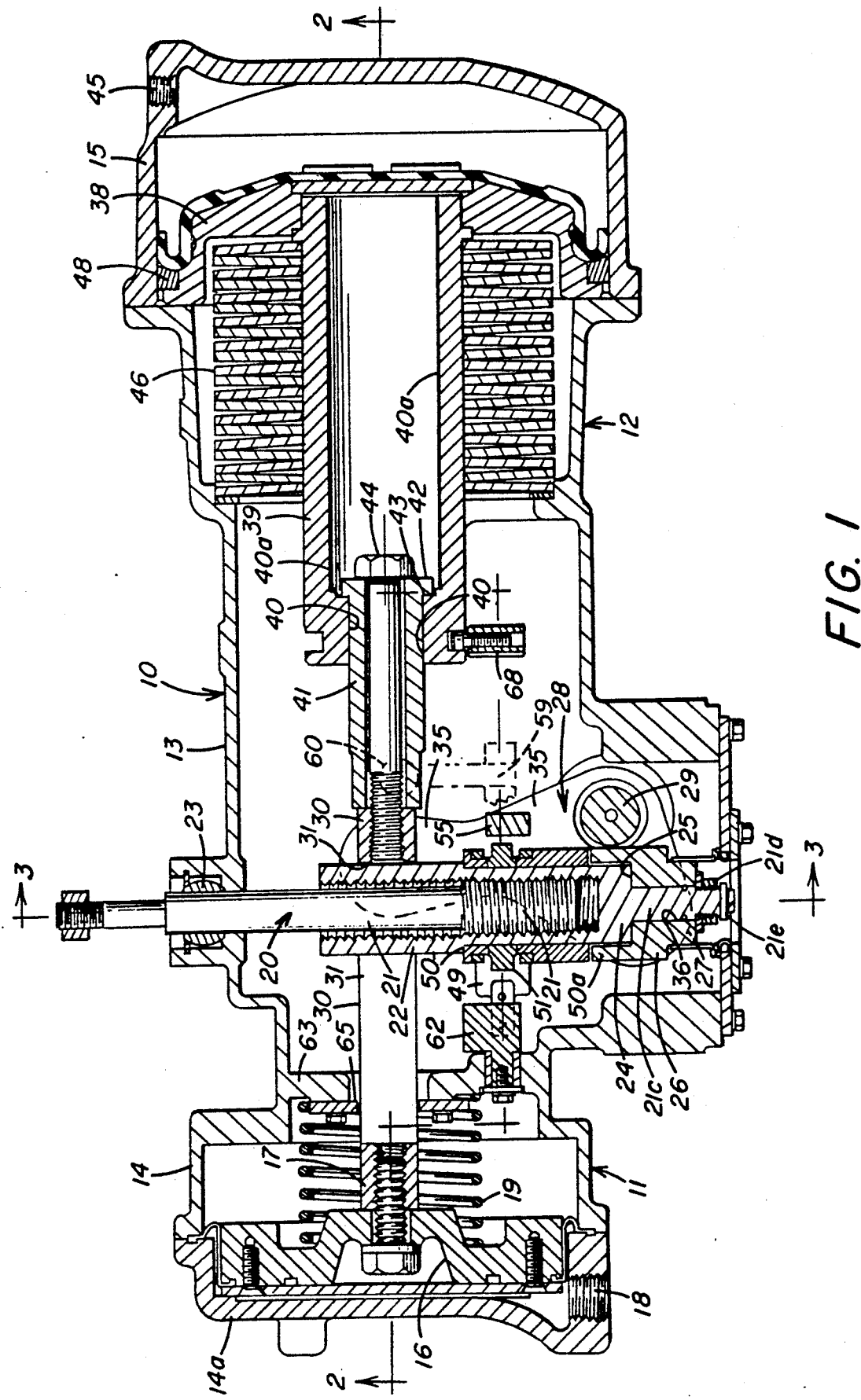
FIG. 1 is a sectional assembly view of the force actuator of the present invention.

Referring to FIGS. 1 and 2, there is provided an actuator device 10 including a service brake portion 11, and an emergency/parking brake portion 12 in a housing 13. Service brake portion 11 comprises a service brake cylinder 14 and emergency/parking brake portion 12 comprises an emergency/parking brake cylinder 15. A service brake piston 16 is reciprocally disposed in service brake cylinder 14 and includes a push rod 17 that extends toward emergency/parking brake portion 12. A port 18 is provided in the service brake cylinder 14 via which fluid pressure may be supplied to the pressure side of service brake piston 16 and released therefrom. A return spring 19 acts on the opposite or non-pressure side of service brake piston 16 to urge the piston into engagement with a stop provided by the cylinder cover 14a.

Figure 3:
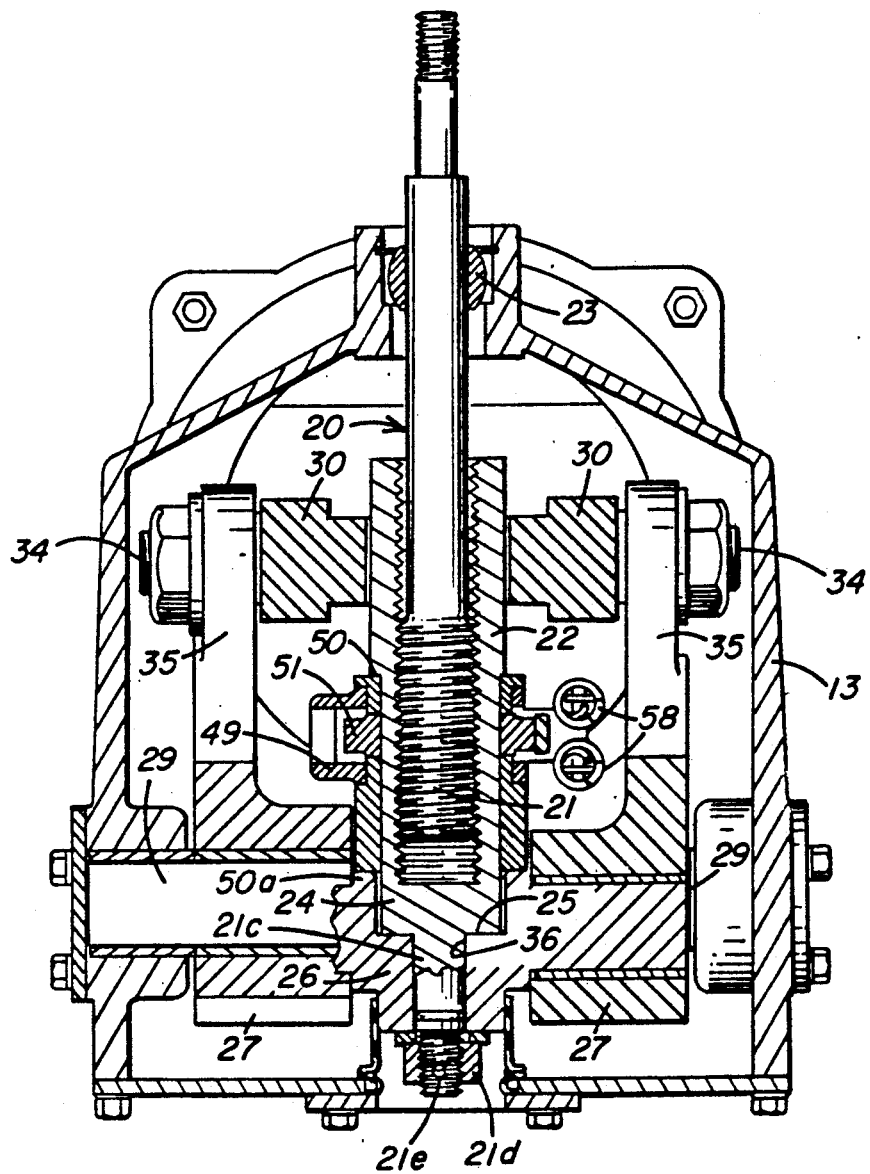
FIG. 3 is a section view taken along the lines 3—3 of FIG. 1.

An actuator rod assembly 20 is disposed in housing 13 between service brake cylinder 14 and emergency/parking brake cylinder 15. As best seen in FIGS. 1 and 3, actuator rod assembly 20 comprises a screw rod 21 on which an internally-threaded hollow rod 22 is rotatably connected. The non-threaded end of screw rod 21 projects externally of the brake actuator housing 13 for connection with brake apparatus, such as, a tread or disc brake, or the like (not shown), guided by a spherical joint 23. A flanged end 24 of hollow rod 22, apart from its threaded connection with screw rod 21, rests on a support base 25 of a socket member 26. Socket member 26 is formed on one arm 27 of a bellcrank lever 28 that is pivotally connected to housing 13 by a trunnion 29.

The service piston push rod 17 is formed with a yoke 30 to provide an opening 31 through which the actuator rod assembly 20 projects. Opening 31 is elongated in the direction of operation of service brake piston 16 to accommodate motion thereof. Yoke 30 is formed with U-shaped openings 32 having rollers 33. Rollers 33 include outwardly-directed pins 34 to which the respective arms 35 of bellcrank lever 28 are connected. As best seen in FIG. 3, the other bellcrank lever arm 35 is bifurcated.

Socket member 26 is provided with a through opening 36 via which a shaft 21c of hollow rod 22 extends. The end of shaft 21c is threaded to receive a nut 21d. Following assembly on shaft 21c, nut 21d is locked against rotation relative to shaft 21c by insertion of a pin 21e through the nut and shaft. This provides a drive arrangement via which the slack adjuster may be manually operated to let out slack, such as to accommodate the replacement of brake shoes.

Reciprocally disposed in emergency/parking brake cylinder 15 is a piston 38 having a hollow push rod 39 that projects inwardly into housing 13 coaxial with service brake piston 16. A guide bore 40 and counterbore 40a of push rod 39 receive an extension member 41 having a flange 42 supported on a shoulder 43 between bores 40 and 40a. Extension member 41 abuts yoke 30 of service piston push rod 17 to which it is fastened by a through bolt 44, so as to become an integral part of service piston push rod 17. A port 45 is provided in the emergency/parking brake cylinder 15 via which fluid pressure may be supplied to the face of piston 38 to urge the piston in a release direction. Acting on the non-pressure side of emergency/parking brake piston 38 is a spring pack 46 comprising a plurality of stacked belleville-type spring washers. These spring washers are normally maintained in a compressed state, as shown, due to the fluid pressure force acting on the face of the piston. The periphery of emergency/parking brake piston 38 is fit with an annular plastic guide ring 48 that is engageable with the wall of emergency/parking brake cylinder 15 to thereby maintain proper axial piston alignment. This alignment is transferred to service brake piston 16 by reason of its push rod connection with extension member 41, which is, in turn, operable within guide bore 40 of the emergency/parking brake piston push rod 39.

A slack adjuster bracket 49 is carried on hollow rod 22 of the actuator rod assembly 20 by a shoulder 50 at one end and an annular rim 50a of socket 26. A ratchet wheel 51 is rotatably locked to hollow rod 22 by reason of a key 52 formed on the ratchet wheel and a keyway 53 on hollow rod 22. Pivotally-mounted to slack adjuster bracket 49 by a pin 54 is a support lever 55 having a pawl 56 pivotally suspended by a pin 57 at its free end. A pair of take-up springs 58 are each connected at one end to slack adjuster bracket 49 and at their other end to pawl 56, so as to exert a force on pawl 56 in a direction generally tangent to the circumference of the ratchet wheel teeth at the point of engagement therewith. As best shown in FIG. 1, there is connected to pawl 56 a trigger arm 59 having a roller 60 spaced in proximity with yoke 30, so as to be engaged by movement of service piston 16 after a predetermined distance. A detent spring member 61 is screwed to the slack adjuster mounting bracket for engagement with ratchet wheel 51 to prevent inadvertent rotation of the ratchet wheel due to vibration. An anti-rotation element 62 is carried on a wall 63 that serves as a spring seat for the service piston return spring 19. Anti-rotation element 62 is disposed adjacent the slack adjuster mechanism in a vertical channel 64 formed by the slack adjuster bracket 49 to thereby prevent rotation of the slack adjuster bracket by take-up spring 58 when roller 60 is engaged by yoke 30 to trigger the slack adjuster. Further provided on wall 63 is a guide plate 65 for maintaining proper axial alignment of service piston 16.

Connected to emergency/parking brake piston 38, via an annular groove 66 that encircles the periphery of piston push rod 39, is a slack adjuster disabling mechanism 67. An actuating lever 68 of disabling mechanism 67 carries a follower pin 69 at one end that rides in annular groove 66. A pin 70 pivotally connects actuating lever 68 at a point intermediate its ends to a support bracket 71 on which the disabling mechanism 67 is mounted. The support bracket 71 is formed on the inside of a cover 72 that closes an access opening 73 in housing 13. Another pin 74 pivotally mounts a vane 75 to support bracket 71 at a location in which the vane 75 is capable of being rotated into and out of the line of motion of pawl 56, as shown in FIGS. 2 and 4. A link 76 connects the free end of actuating lever 68 to vane 75 such that axial movement of the emergency/parking brake piston 38 effects the aforementioned rotation of vane 75. The surface of vane 75 in the path of pawl 56 is arcuate, the center point of the radius of this arcuate surface being congruent with the axis of pivot pin 74, for a purpose hereinafter explained.

In the deactivated or released condition of the brake actuator device 10, pneumatic pressure is absent from the face of service brake piston 16, allowing return spring 19 to force service brake piston 16 leftwardly against its stop on the cylinder cover 14a. At the same time, pneumatic pressure is applied to the face of emergency/parking brake piston 38 to force this piston leftwardly, compressing its spring pack 46. When it is desired to apply the brakes, pneumatic pressure is applied to port 18 and the face of service brake piston 16, forcing the piston rightwardly. This rightward movement of service brake piston 16 is translated by bellcrank lever 28 into movement of actuator rod assembly 20 in a direction substantially perpendicular to the direction of movement of the service brake piston 16. The relative length of the bellcrank lever arms 27 and 35 provides the mechanical advantage necessary to achieve the desired brake forces at the output end of hollow rod 22. Spherical joint 23 allows swivel movement of the hollow actuating rod assembly, due to the arcuate motion of the bellcrank lever arm 27, while the U-shaped opening in yoke 3 for roller 33 is provided to allow for displacement of the bellcrank lever arm 35 from axial alignment with service brake piston 16 due to arcuate motion of bellcrank lever arm 35. The service piston stroke takes place independently of emergency/parking brake piston 38 due to the lost-motion connection provided between flange 42 of extension member 41 and shoulder 43 in the emergency/parking brake piston push rod 39.

In the event the piston stroke becomes excessive due, for example, to brake shoe wear, yoke 30 engages roller 60 of trigger arm 59 to activate the slack adjuster device. When this occurs, pivot lever 55 is rotated about pivot pin 54 in a counterclockwise direction, as viewed in FIG. 2, thereby pulling pawl 56 rightwardly against the resistance of spring 58 to permit the end of the pawl to engage a tooth of the ratchet wheel. A subsequent release of pneumatic pressure from the face of service brake piston 16 to effect a release of the service brake application allows return spring 19 to force service brake piston 16 leftwardly to its release position. As this occurs, yoke 30 is disengaged from roller 60 of trigger arm 59 and the take-up springs 58 are effective to pull pawl 56 in a leftward direction, whereby ratchet wheel 51 is caused to rotate in a clockwise direction, turning hollow rod 22 with it. In that screw rod 21 is rotatably fixed relative to hollow rod 22, by reason of its connection with the appropriate tread or disc brake apparatus (not shown), the screw rod 21 is forced to move axially with rotation of the hollow rod 22, thereby increasing the length of the actuator rod assembly 20. This slack adjuster action not only tends to maintain the optimum position of bellcrank lever arm 35 at the point of brake engagement, but also maintains flange 42 of extension member 41 in engagement with shoulder 43 of emergency/parking brake push rod 39 in the release position of service brake piston 16, for a purpose to now be explained.

Assuming it is desired to activate the emergency/parking brake piston 38 with the service brake piston 16 in the release position shown, pneumatic pressure is released from port 45. As the pneumatic pressure on the face of emergency/parking brake piston 38 is reduced, spring pack 46 is effective to force piston 38 rightwardly. Since shoulder 43 is engaged with flange 42, this rightward movement of emergency/parking brake piston 38 pulls extension member 41 of yoke 30 rightwardly with the emergency/parking brake piston 38. Thus, the force of spring pack 46 is transmitted to the actuating rod assembly 20 via bellcrank lever 28 in the same manner as the service brake force.

In the event the service brake piston 16 is in the applied position at the time the emergency/parking brake piston 16 is activated, flange 42 of extension member 41 will be spaced apart axially from shoulder 43 a distance maintained constant by the slack adjuster action. As the spring pack 46 subsequently forces emergency/parking brake piston 38 rightwardly, shoulder 43 will pick up flange 42 of extension member 41 and thereby transmit the emergency/parking brake spring force to the actuating rod assembly 20 through the bellcrank lever 28, as previously explained, this emergency/parking brake force being additive with the service brake force. It will thus be apparent that if the emergency/parking brake piston 38 is applied while the service brake piston is released, the spring pack 46 will expand a predetermined amount before the actuating rod assembly is moved sufficiently to take up the brake shoe clearance. On the other hand, if service brake piston 16 is in the application position at the time the emergency/parking brake piston is applied, the brake shoes will already be engaged so that no further slack take-up is required. Thus, the spring pack 46 will again expand by the same distance until shoulder 43 engages flange 42 of extension member 41 to transfer the spring force to the actuating rod assembly 20. It will be apparent, therefore, that the slack adjuster action assures that the amount of spring expansion remains constant under both conditions of a brake release or brake application of the service brake piston 16 so that a constant output spring force is realized.

In accordance with the present invention, a slack adjuster disabling mechanism 6 is provided to prevent operation of the slack adjuster whenever the emergency/parking brake piston 38 is actuated, the purpose being to alleviate the aforementioned problems associated with the slack adjuster during manual brake release and during concurrent operation of the service and emergency/parking brakes.

In making a manual release of a parking brake application, for example, nut 21d is turned in a counterclockwise direction. Shaft 21c, which is staked to nut 21d by pin 21e, in turn, effects counterclockwise rotation of hollow rod 22, thereby forcing screw rod 21 to be drawn into hollow rod 22. This increases the piston stroke required to maintain brake shoe/disc engagement, the net result being that service brake piston 16 and emergency/parking brake piston 38 eventually bottoms out on their respective stops, thereby removing braking force. Continued rotation of nut 21d will now be effective to retract the brake shoes/disc out of brake engagement.

The degree of piston travel necessary to cause the service and parking brake pistons to bottom out results in corresponding rightward movement of yoke 30, as viewed in FIG. 1. Slack adjuster pawl 56 is thus pulled in a rightward direction, as viewed in FIG. 2, by engagement of yoke 30 with roller 60, to which pawl 56 is connected through trigger arm 59. In that this distance is greater than that which normally occurs between successive take-up strokes of the slack adjuster, the degree of rotation of pawl 56 in a clockwise direction about its mounting pin 57, as shown in phantom in FIG. 4, is also greater than normal. The resultant attitude of pawl 56 relative to ratchet wheel 51 changes from a desired tangential alignment toward radial alignment, thus increasing the likelihood of the pawl 56 becoming jammed in the ratchet wheel teeth.

However, since actuating lever 68 of the slack adjuster disabling mechanism 67 is connected by pin 69 to the annular groove 66 in emergency/parking brake piston rod 39, it will be apparent that any time the emergency/parking brake piston 38 is actuated, actuating lever 68 is rotated in a clockwise direction about pivot pin 70, to in turn cause link 76 to impart clockwise rotation of vane 75 about pivot pin 74. This results in vane 75 being shifted from a passive position, as shown in FIG. 2, to an active position, as shown in FIG. 4, wherein vane 75 is aligned in the path of travel of pawl 56. In that vane 75 lies in the path of travel of pawl 56 in this active position, it will be appreciated that such excessive rightward movement of pawl 56, due to the conditions heretofore discussed, results in the surface of pawl 56, adjacent vane 75, encountering the arcuate circumference of the vane on the side of pawl pivot pin 57, opposite the point of engagement of pawl 56 with the ratchet wheel teeth. This causes the pawl 56 to be rotated in a counterclockwise direction about its pivot pin 57 to prevent pawl 56 from assuming the position it would otherwise assume in the absence of the slack adjuster disabling mechanism 67. Pawl 56 is, therefore, maintained disengaged from the ratchet wheel teeth to avoid the possibility of the slack adjuster becoming jammed and thus inoperative during subsequent release operation of brake actuator 10.

Similarly, concurrent operation of the service and emergency/parking brakes results in the slack adjuster disabling mechanism 67 being operated from a passive position, which it normally assumes in release position of the emergency/parking brake piston 38, to an active position, in which the slack adjuster pawl 56 is disengaged from the ratchet wheel teeth, as explained. In this latter case, however, the emergency/parking brake piston travel is insufficient to allow piston 38 to bottom out on its stop, but rather, the piston moves rightwardly a distance that is somewhat greater than the nominal piston stroke by an amount corresponding to the deformation of the various rigging components, due to the combined forces of the service and emergency/parking brakes. While the amount of rotation of vane 75, in this case, is less than in the case where the emergency/parking brake 38 bottoms out, it is still sufficient to rotate vane 75 into the path of movement of pawl 56. Since the center of the arcuate surface of vane 75 is at pivot pin 74, about which vane 75 rotates, it will be appreciated that regardless of the degree of rotation of vane 75 into the path of travel of pawl 56, pawl 56 will be disengaged from the ratchet wheel teeth by the same amount to assure that the slack adjuster is appropriately disabled in either of the discussed instances.

When emergency/parking brake piston 38 is returned to its release position, the slack adjuster disabling mechanism 67 will likewise be returned to its passive position. In returning to a passive position, however, vane 75 will continue to maintain engagement with pawl 56 as the pawl is concurrently pulled leftwardly by take-up springs 58, until such time as the pawl 56 has returned to a position approaching its normal release position shown in FIG. 2. Consequently, pawl 56 is returned without having engaged any teeth of the ratchet wheel and, accordingly, no take-up action of the slack adjuster occurs.

I claim:
1. A brake actuator device comprising:
    (a) An actuator rod assembly including:
        (i) a hollow rod having internal threads; and
        (ii) an output rod having screw-threaded engagement with said hollow rod, said output rod being fixed against rotation.
    (b) service brake means for effecting axial operation of said actuator rod assembly;
    (c) slack adjuster means for varying the effective axial length of said output rod including:
        (i) a ratchet wheel rotatably fixed on said hollow rod and having teeth disposed about the circumference thereof;
        (ii) a pawl normally aligned tangentially relative to the circumference of said ratchet wheel;
        (iii) trigger means for shifting said pawl in a first direction in which said pawl rides over the teeth of said ratchet wheel without engagement therewith in response to said operation of said service brake means; and
        (iv) spring means for pulling said pawl in a second direction opposite said first direction in which said pawl is engageable with the teeth of said ratchet wheel to effect rotation of said ratchet wheel, whereby said hollow rod is accordingly rotated to adjust the axial length of said output rod relative thereto.
    (d) emergency/parking brake means operable for effecting operation of said actuator rod assembly;
    (e) lost-motion means for connecting said emergency/parking brake means to said service brake means to effect said operation of said actuator rod assembly via said service brake means when said emergency/parking brake means is operated and for disconnecting said emergency/parking brake means from said service brake means when said service brake means is operated independently of said emergency/parking brake means; and
    (f) a vane member having a passive position and an active position;
    (g) an actuator lever;
    (h) a first pin on which said actuator lever is pivotally mounted at a location intermediate its ends;
    (i) a second pin on which said vane member is pivotally mounted; and
    (j) a link interconnected between said vane member and one end of said actuator lever, the other end of said actuator lever being actuated in response to operation of said emergency/parking brake means to effect rotation of said vane member between said passive and active positions, said vane member having an arcuate surface provided by a radius from a center congruent with the axial centerline of said second pin which, in said active position thereof, projects into the path of travel of said pawl to prevent said pawl from engaging the teeth of said ratchet wheel when said pawl is shifted in said first and second direction.

2. A brake actuator device, as recited in claim 1, wherein said slack adjuster means further comprises:
    (a) a mounting bracket;
    (b) a support arm pivotally suspended from said mounting bracket; and
    (c) a third pin pivotally connecting said pawl to said support arm, said arcuate surface of said vane member in said active position being engageable with said pawl at a location spaced from said third pin to thereby effect rotation of said pawl about said third pin in a direction to disengage said pawl from said ratchet wheel teeth.

3. A brake actuator device, as recited in claim 2, wherein said emergency/parking brake means comprises:
    (a) a piston member; and
    (b) a push rod connected to said piston member, said push rod having an annular groove encircling the periphery thereof in which the other end of said actuator lever is slidably disposed to connect said actuator lever to said push rod.

4. A brake actuator device, as recited in claim 3, wherein said slack adjuster disabling mechanism further comprises pin means for connecting said other end of said actuator lever to said annular groove to provide said connection of said actuator lever to said push rod.

* * * * *